(12) United States Patent
Fujinami et al.

(10) Patent No.: US 9,598,615 B2
(45) Date of Patent: *Mar. 21, 2017

(54) PROPYLENE-TYPE POLYMER AND HOT-MELT ADHESIVE AGENT

(71) Applicant: IDEMITSU KOSAN CO., LTD., Chiyoda-ku (JP)

(72) Inventors: Hiroki Fujinami, Narashino (JP); Kazuhiro Hashima, Chiba (JP); Yutaka Minami, Chiba (JP); Tomoaki Takebe, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/767,462

(22) PCT Filed: Feb. 3, 2014

(86) PCT No.: PCT/JP2014/052469
§ 371 (c)(1),
(2) Date: Aug. 12, 2015

(87) PCT Pub. No.: WO2014/129301
PCT Pub. Date: Aug. 28, 2014

(65) Prior Publication Data
US 2015/0368522 A1    Dec. 24, 2015

(30) Foreign Application Priority Data
Feb. 22, 2013    (JP) ................. 2013-033909

(51) Int. Cl.
| | | |
|---|---|---|
| *C09J 191/06* | (2006.01) | |
| *C09J 123/08* | (2006.01) | |
| *C09J 11/08* | (2006.01) | |
| *C08L 23/08* | (2006.01) | |
| *C08F 110/06* | (2006.01) | |

(52) U.S. Cl.
CPC ....... *C09J 123/0815* (2013.01); *C08F 110/06* (2013.01); *C08L 23/0815* (2013.01); *C09J 11/08* (2013.01); *C09J 191/06* (2013.01)

(58) Field of Classification Search
CPC .. C09J 123/0815; C09J 23/0815; C09J 11/08; C09J 191/06; C08F 110/06; C08L 23/0815
See application file for complete search history.

(56) References Cited

U.S. PATENT DOCUMENTS

| | | |
|---|---|---|
| 7,378,481 B1 | 5/2008 | Gong et al. |
| 2003/0017940 A1 | 1/2003 | Kashiwamura et al. |
| 2004/0076804 A1 | 4/2004 | Kijima et al. |
| 2004/0115456 A1 | 6/2004 | Kanderski et al. |
| 2005/0159566 A1 | 7/2005 | Minami et al. |
| 2010/0324242 A1 | 12/2010 | Machida et al. |
| 2015/0284600 A1* | 10/2015 | Kobayashi et al. .. C08F 110/06 156/334 |
| 2016/0115360 A1* | 4/2016 | Hashima et al. ......... C09J 5/06 524/582 |

FOREIGN PATENT DOCUMENTS

| | | |
|---|---|---|
| JP | 8-183941 A | 7/1996 |
| JP | 2002-146130 A | 5/2002 |
| JP | 2006-515893 A | 6/2006 |
| JP | 2008-285443 A | 11/2008 |
| JP | 2010-518235 A | 5/2010 |
| WO | 02/24714 A1 | 3/2002 |
| WO | 03/091289 A1 | 11/2003 |
| WO | 2006/069205 A1 | 6/2006 |
| WO | 2008/047860 A1 | 4/2008 |

OTHER PUBLICATIONS

International Search Report issued Apr. 15, 2014 for PCT/JP2014/052469 filed Feb. 3, 2014.
Extended European Search Report dated Oct. 20, 2016 issued in corresponding European patent application No. 14753469.7.

* cited by examiner

Primary Examiner — Nathan M Nutter
(74) Attorney, Agent, or Firm — Oblon, McClelland, Maier & Neustadt, L.L.P.

(57) ABSTRACT

Provided are a propylene-based polymer which enhances heat creep resistance and a hot-melt adhesive having excellent heat creep resistance. A propylene-based polymer which satisfies the following (1) and (2): (1) $125 \leq$ a modulus of elasticity in tension (MPa) at 23° C. $\leq 400$; and (2) $100 \leq$ an elongation at break (%) at 23° C. $\leq 1,000$, and a hot-melt adhesive containing the propylene-based polymer in an amount of 1 to 50% by mass.

9 Claims, No Drawings

PROPYLENE-TYPE POLYMER AND HOT-MELT ADHESIVE AGENT

TECHNICAL FIELD

The present invention relates to a propylene-based polymer and a hot-melt adhesive, particularly relates to a propylene-based polymer, which can be applied as a modifier for a hot-melt adhesive and a hot-melt adhesive using the same.

BACKGROUND ART

A hot-melt adhesive is a solvent-free adhesive and has a characteristic that instant bonding and high-speed bonding can be achieved since adhesiveness is exhibited after the adhesive is melted by heating and coated onto an adherend, followed by cooling to solidify the adhesive, and therefore has been used in a wide range of fields. Not only adherends to be bonded with such a hot-melt adhesive but also the conditions of use thereof are various. At present, various hot-melt adhesives for use in various applications have been developed and supplied to the market. Also for the conditions of use, various operating temperatures ranging from low temperatures to high temperatures are considered.

In general, a creep phenomenon occurs such that when a given stress is applied to a bonded part for a long period of time, even if the stress is not higher than the breaking strength of an adhesive, elongation occurs to cause breakage, and this phenomenon prominently occurs under high temperatures. In recent years, a hot-melt adhesive having excellent heat resistance, particularly excellent heat creep resistance has been demanded.

PTL 1 discloses a hot-melt adhesive containing an ethylene-based copolymer as a base polymer and also containing a tackifier resin and a wax. This adhesive has high adhesive strength at low temperatures, but its heat resistance, particularly heat creep resistance is poor as an adhesive.

PTL 2 discloses that in order to improve the heat resistance of a hot-melt adhesive, a specific polymer (a functionalized metallocene polymer) is used as a base polymer. However, the hot-melt adhesive described in PTL 2 does not fully satisfy the heat resistance requested by users.

CITATION LIST

Patent Literature

PTL 1: JP 8-183941 A
PTL 2: JP 2010-518235 A

SUMMARY OF INVENTION

Technical Problem

An object of the present invention is to provide a propylene-based polymer which enhances heat creep resistance and a hot-melt adhesive having excellent heat creep resistance.

Solution to Problem

According to the present invention, the following propylene-based polymer, hot-melt adhesive, and bonding method are provided.

[1] A propylene-based polymer which satisfies the following (1) and (2):
(1) $125 \leq$ a modulus of elasticity in tension (MPa) at 23° C. $\leq 400$; and
(2) $100 \leq$ an elongation at break (%) at 23° C. $\leq 1,000$.

[2] The propylene-based polymer according to the above [1], wherein the propylene-based polymer is a propylene homopolymer.

[3] The propylene-based polymer according to the above [1] or [2], wherein the following (a) to (d) are satisfied:
(a) [mmmm]=20 to 80 mol %;
(b) a weight-average molecular weight (Mw)=10,000 to 80,000;
(c) $Mw/Mn \leq 2.5$; and
(d) [rmrm]<2.5 mol %.

[4] The propylene-based polymer according to the above [3], wherein the following (a') and (b') are further satisfied:
(a') [mmmm]=60 to 80 mol %; and
(b') a weight-average molecular weight (Mw)=10,000 to 55,000.

[5] A hot-melt adhesive, containing the propylene-based polymer according to any one of the above [1] to [4] in an amount of 1 to 50% by mass.

[6] The hot-melt adhesive according to the above [5], containing the propylene-based polymer in an amount of 1 to 30 parts by mass with respect to 100 parts by mass of an ethylene-based polymer (A).

[7] The hot-melt adhesive according to the above [6], wherein the ethylene-based polymer (A) is an ethylene-α-olefin copolymer.

[8] The hot-melt adhesive according to the above [6] or [7], wherein the ethylene-based polymer (A) is an ethylene-1-octene copolymer.

[9] The hot-melt adhesive according to the above [8], wherein the ethylene-based polymer (A) is an ethylene-1-octene copolymer containing 63 to 65% by mass of a structural unit derived from ethylene and 35 to 37% by mass of a structural unit derived from 1-octene.

[10] The hot-melt adhesive according to any one of the above [5] to [9], further containing a tackifier resin (C) in an amount of 50 to 200 parts by mass and a wax (D) in an amount of 50 to 200 parts by mass with respect to 100 parts by mass of the ethylene-based polymer (A).

[11] A method for bonding a base material to another base material, including a step of melting the hot-melt adhesive according to any one of the above [5] to [10] and coating the adhesive onto at least one base material, and a step of bonding the other base material to the coated hot-melt adhesive.

Advantageous Effects of Invention

The hot-melt adhesive containing the propylene-based polymer of the present invention as a modifier has excellent heat creep resistance.

DESCRIPTION OF EMBODIMENTS

Propylene-Based Polymer

The "propylene-based polymer" in the present invention is a propylene-based polymer containing a propylene unit as a main component, and is a propylene homopolymer or a copolymer in which the copolymerization ratio of a propylene unit is 50 mol % or more, preferably 70 mol % or more, more preferably 90 mol % or more. Further, the propylene-based polymer may be composed only of one propylene homopolymer, or may be a mixture of two or more propylene homopolymers having different molecular weights, stereoregularities, or the like.

The propylene-based polymer of the present invention satisfies the following (1) and (2):

(1) 125≤a modulus of elasticity in tension (MPa) at 23° C.≤400; and (2) 100≤an elongation at break (%) at 23° C.≤1,000.

In general, as the modulus of elasticity in tension of a material is lower, the flexibility of the material is higher, and the material is preferred as a soft material. Further, as the tensile elongation at break of a material is higher, the material is less likely to be ruptured during a bending process, and therefore is favorable. As a result of intensive studies, the present inventors found that the heat creep resistance is governed by a balance between the stretchability and the rigidity (elasticity) of a resin. That is, as the rigidity (elasticity) of a resin is higher, the stretching deformation of the resin at a given load can be delayed, and on the other hand, as the stretchability of a resin is higher, the breakage of the resin at a given load can be delayed. Therefore, it was found that by setting the modulus of elasticity in tension and the elongation at break of a resin within specific ranges, respectively, the heat creep resistance of a hot-melt adhesive using the resin can be improved. The present invention has been achieved based on such a finding.

(Modulus of Elasticity in Tension)

The modulus of elasticity in tension at 23° C. of the propylene-based polymer of the present invention is 125 MPa or more, preferably 150 MPa or more, more preferably 180 MPa or more, and also 400 MPa or less, preferably 350 MPa or less, more preferably 300 MPa or less. From the viewpoint of the adhesive strength between a hot-melt adhesive and an adherend, in order to bring the hot-melt adhesive into close contact with the irregularities of the surface of the adherend, it is important that the hot-melt adhesive is moderately soft, and on the other hand, in order to prevent the hot-melt adhesive brought into close contact with the irregularities of the surface of the adherend from being easily peeled off, it is important that the hot-melt adhesive is moderately hard.

The modulus of elasticity in tension of the propylene-based polymer of the present invention is measured by the method described in Examples.

The modulus of elasticity in tension of the propylene-based polymer of the present invention can be controlled within a desired range by adjusting [mmmm] by changing the polymerization conditions (a reaction temperature, a reaction time, a catalyst, or a promoter), or by adding an additive during polymerization, or by mixing with another propylene-based polymer having a different modulus of elasticity in tension.

(Elongation at Break)

The elongation at break at 23° C. of the propylene-based polymer of the present invention is 100% or more, preferably 200% or more, more preferably 300% or more, particularly preferably 400% or more, and also 1,000% or less, preferably 800% or less, more preferably 750% or less, further more preferably 700% or less. From the viewpoint of the adhesive strength between a hot-melt adhesive and an adherend, in order to bring the hot-melt adhesive into close contact with the irregularities of the surface of the adherend, it is important that the hot-melt adhesive is moderately soft. On the other hand, if the hot-melt adhesive is too soft, it is easily peeled off, and therefore, such an adhesive is not preferred.

The elongation at break of the propylene-based polymer of the present invention is measured by the method described in Examples.

The elongation at break of the propylene-based polymer of the present invention can be controlled within a desired range by changing the polymerization conditions (a reaction temperature, a reaction time, a catalyst, or a promoter), or by adding an additive during polymerization, or by mixing with another propylene-based polymer having a different elongation at break.

Further, the propylene-based polymer of the present invention preferably satisfies the following (a) to (d), more preferably, further satisfies the following (a') and (b'), further more preferably, further satisfies the following (e), and still further more preferably, further satisfies the following (f).

(a) [mmmm]=20 to 80 mol %

(a') [mmmm]=60 to 80 mol %

(b) a weight-average molecular weight (Mw)=10,000 to 80,000

(b') a weight-average molecular weight (Mw)=10,000 to 55,000

(c) Mw/Mn≤2.5

(d) [rmrm]<2.5 mol %

(e) a melting point (Tm-D)=0 to 140° C.

(f) a limiting viscosity [η]=0.01 to 2.0 dL/g

In the above formulae, [mmmm] represents a meso pentad fraction, and [rmrm] represents a racemic meso racemic meso pentad fraction.

The propylene-based polymer of the present invention is preferably a propylene homopolymer, but may be a copolymer between propylene and another olefin.

Examples of a comonomer other than propylene in the propylene-based copolymer include ethylene and α-olefins having 4 or more carbon atoms (preferably α-olefins having 4 to 20 carbon atoms). Specific examples of the α-olefin include 1-butene, 1-pentene, 4-methyl-1-pentene, 1-hexene, 1-octene, 1-decene, 1-dodecene, 1-tetradecene, 1-hexadecene, 1-octadecene, and 1-eicosene. In the present invention, among these, one type or two or more types can be used.

In the present invention, the meso pentad fraction [mmmm] and the racemic meso racemic meso pentad fraction [rmrm] are determined in accordance with the method proposed in "Macromolecules, 6, 925 (1973)" by A. Zambelli et al., and are a meso fraction and a racemic meso racemic meso fraction in a pentad unit in a polypropylene molecular chain measured with the signal of a methyl group in the $^{13}$C-NMR spectrum.

The measurement of the $^{13}$C-NMR spectrum is carried out using the following device under the following conditions.

Device: $^{13}$C-NMR spectrometer, JNM-EX400 series manufactured by JEOL, Ltd.

Method: proton complete decoupling method

Concentration: 220 mg/mL

Solvent: a mixed solvent of 1,2,4-trichlorobenzene and deuterated benzene at 90:10 (volume ratio)

Temperature: 130° C.

Pulse width: 45°

Pulse repetition time: 4 seconds

Accumulation: 10,000 times

<Calculation Formulae>

$$M = m/S \times 100$$

$$R = \gamma/S \times 100$$

$$S = P_{\beta\beta} + P_{\alpha\beta} + P_{\alpha\gamma}$$

S: signal intensity of carbon atoms of side-chain methyl in all propylene units

Pββ: 19.8 to 22.5 ppm
Pαβ: 18.0 to 17.5 ppm
Pαγ: 17.5 to 17.1 ppm
γ: racemic pentad chain: 20.7 to 20.3 ppm
m: meso pentad chain: 21.7 to 22.5 ppm Further, in the present invention, the weight-average molecular weight (Mw) and the number-average molecular weight (Mn) are a weight-average molecular weight and a number-average molecular weight in terms of polystyrene measured using the following device under the following conditions. The molecular weight distribution (Mw/Mn) is a value calculated from the weight-average molecular weight (Mw) and the number-average molecular weight (Mn).

<GPC Measuring Device>
Column: TOSO GMHHR-H(S)HT
Detector: RI detector for liquid chromatography, Waters 150C <Measurement Conditions>
Solvent: 1,2,4-trichlorobenzene
Measurement temperature: 145° C.
Flow rate: 1.0 mL/min
Sample concentration: 2.2 mg/mL
Injection amount: 160 μL
Calibration curve: Universal Calibration
Analysis software: HT-GPC (ver. 1.0)

(a) Meso Pentad Fraction [mmmm]

The meso pentad fraction [mmmm] of the propylene-based polymer of the present invention is preferably from 20 to 80 mol %, more preferably from 60 to 80 mol %, further more preferably more than 60 mol % and 80 mol % or less, still further more preferably more than 60 mol % and 75 mol % or less, yet still further more preferably more than 60 mol % and 72 mol % or less. When the [mmmm] is 20 mol % or more, the heat creep resistance is excellent. When the [mmmm] is 60 mol % or more, the cohesive force and the heat creep resistance are excellent. Further, when the [mmmm] is 80 mol % or less, favorable wettability to an adherend is exhibited. The meso pentad fraction can be controlled by, for example, adjusting the structure of a catalyst, a polymerization temperature, or a propylene pressure.

(b) Weight-Average Molecular Weight (Mw)

The weight-average molecular weight of the propylene-based polymer of the present invention is preferably from 10,000 to 80,000, more preferably from 10,000 to 55,000, further more preferably from 10,000 to 51,000, still further more preferably from 15,000 to 40,000, yet still further more preferably from 15,000 to 37,000. When the weight-average molecular weight is 10,000 or more, the cohesive force and the heat creep resistance are strong. Further, when the weight-average molecular weight is 80,000 or less, the viscosity is appropriate and the coatability is favorable. The weight-average molecular weight can be controlled by appropriately adjusting the polymerization conditions (such as a propylene pressure and a polymerization time).

(c) Molecular Weight Distribution (Mw/Mn)

The molecular weight distribution (Mw/Mn) of the propylene-based polymer of the present invention is preferably 2.5 or less, more preferably 2.4 or less, further more preferably 2.2 or less. When the molecular weight distribution is 2.5 or less, the coatability is excellent. The molecular weight distribution (Mw/Mn) can be set to 2.5 or less by using a metallocene-based catalyst.

(d) Racemic Meso Racemic Meso Fraction [rmrm]

The racemic meso racemic meso fraction [rmrm] of the propylene-based polymer of the present invention is preferably less than 2.5 mol %, more preferably less than 2.4 mol %, further more preferably less than 2.2 mol %. When the [rmrm] is less than 2.5 mol %, a favorable cohesive force is exhibited. The [rmrm] can be controlled by appropriately changing the catalyst using the metallocene catalyst as described herein.

(e) Melting Point (Tm-D)

The melting point (Tm-D) of the propylene-based polymer of the present invention is preferably from 0 to 140° C., more preferably from 20 to 120° C., further more preferably from 90 to 120° C. from the viewpoint of the improvement of the open time and also the improvement of the heat creep resistance.

In the present invention, the peak top of a peak observed on the highest temperature side in a melting endothermic curve obtained by using a differential scanning calorimeter (manufactured by PerkinElmer Co., Ltd., DSC-7), and keeping 10 mg of a sample in a nitrogen atmosphere at −10° C. for 5 minutes, and then raising the temperature at 10° C./min is defined as the melting point (Tm-D). The melting point can be controlled by adjusting the monomer concentration or the reaction pressure.

(f) Limiting Viscosity [η]

From the viewpoint of the stringiness during coating, the limiting viscosity [η] of the propylene-based polymer of the present invention is preferably from 0.01 to 2.0 dL/g, more preferably from 0.1 to 1.5 dL/g, further more preferably from 0.2 to 0.7 dL/g. The limiting viscosity [η] is measured by the measurement method described in Examples. The limiting viscosity [η] can be controlled by adjusting the polymerization conditions (such as a propylene pressure and a polymerization time).

(Production Method for Propylene-Based Polymer of the Present Invention)

Examples of the production method for the propylene-based polymer of the present invention include a production method for a propylene homopolymer by homopolymerization of propylene using a metallocene catalyst and a production method for a propylene copolymer by copolymerization of propylene and ethylene and/or an α-olefin having 4 or more carbon atoms using a metallocene catalyst.

Examples of the metallocene-based catalyst include catalysts obtained by combining a transition metal compound containing one or two ligands selected from a cyclopentadienyl group, a substituted cyclopentadienyl group, an indenyl group, a substituted indenyl group, and the like as described in JP 58-19309 A, JP S61-130314 A, JP H03-163088 A, JP H04-300887 A, JP H04-211694 A, JP H01-502036 A, and the like, or a transition metal compound, in which the above ligand is geometrically controlled, with a promoter.

In the present invention, among the metallocene catalysts, a case where a catalyst is composed of a transition metal compound in which a ligand forms a crosslinked structure through a crosslinking group is preferred, and above all, a method using a metallocene catalyst obtained by combining a transition metal compound, in which a crosslinked structure is formed through two crosslinking groups, with a promoter is more preferred.

Specific examples of the method include a method of homopolymerizing propylene and a method of copolymerizing propylene and ethylene and/or an α-olefin having 4 or more carbon atoms, wherein the homopolymerization or the copolymerization is carried out in the presence of a polymerization catalyst containing (A) a transition metal compound represented by the general formula (I), and (B) a component selected from (B-1) a compound capable of reacting with the transition metal compound as the component (A) or a derivative thereof to form an ionic complex and (B-2) an aluminoxane.

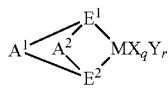
(I)

In the formula, M represents a metal element of Groups 3 to 10 of the Periodic Table or a metal element of the lanthanoid series. $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and form a crosslinked structure through $A^1$ and $A^2$, and further, $E^1$ and $E^2$ may be the same as or different from each other; X represents a σ-bonding ligand, and when plural X's are present, plural X's may be the same as or different from each other and may be crosslinked with any other X, $E^1$, $E^2$, or Y; Y represents a Lewis base, and when plural Y's are present, plural Y's may be the same as or different from each other and may be crosslinked with any other Y, $E^1$, $E^2$, or X; $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^1$—, or —$AlR^1$—, wherein $R^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other; q is an integer of 1 to 5 and represents [(the atomic valence of M)–2]; and r represents an integer of 0 to 3.

In the above general formula (I), M represents a metal element of Groups 3 to 10 of the Periodic Table or a metal element of the lanthanoid series, and specific examples thereof include titanium, zirconium, hafnium, yttrium, vanadium, chromium, manganese, nickel, cobalt, palladium, and lanthanoid series metals. Among these, from the viewpoint of the olefin polymerization activity or the like, metal elements of Group 4 of the Periodic Table are preferred, and particularly, titanium, zirconium, and hafnium are preferred.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group [>CR—, >C<], and a silicon-containing group [>SiR—, >Si<] (wherein R is hydrogen atom, or a hydrocarbon group having 1 to 20 carbon atoms or a heteroatom-containing group), and form a crosslinked structure through $A^1$ and $A^2$. $E^1$ and $E^2$ may be the same as or different from each other. As $E^1$ and $E^2$, a substituted cyclopentadienyl group, an indenyl group, and a substituted indenyl group are preferred. Examples of the substituent include a hydrocarbon group having 1 to 20 carbon atoms and a silicon-containing group.

Further, X represents a σ-bonding ligand, and in the case where plural X's are present, plural X's may be the same as or different from each other and may be crosslinked with any other X, $E^1$, $E^2$, or Y. Specific examples of this X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 40 carbon atoms, a sulfide group having 1 to 20 carbon atoms, and an acyl group having 1 to 20 carbon atoms.

Examples of the halogen atom include a chlorine atom, a fluorine atom, a bromine atom, and an iodine atom. Specific examples of the hydrocarbon group having 1 to 20 carbon atoms include an alkyl group such as a methyl group, an ethyl group, a propyl group, a butyl group, a hexyl group, a cyclohexyl group, and an octyl group; an alkenyl group such as a vinyl group, a propenyl group, and a cyclohexenyl group; an arylalkyl group such as a benzyl group, a phenylethyl group, and a phenylpropyl group; and an aryl group such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group. Above all, an alkyl group such as a methyl group, an ethyl group, and a propyl group; and an aryl group such as a phenyl group are preferred.

Examples of the alkoxy group having 1 to 20 carbon atoms include an alkoxy group such as a methoxy group, an ethoxy group, a propoxy group, and a butoxy group; a phenylmethoxy group, and a phenylethoxy group. Examples of the aryloxy group having 6 to 20 carbon atoms include a phenoxy group, a methylphenoxy group, and a dimethylphenoxy group. Examples of the amide group having 1 to 20 carbon atoms include an alkylamide group such as a dimethylamide group, a diethylamide group, a dipropylamide group, a dibutylamide group, a dicyclohexylamide group, and a methylethylamide group; an alkenylamide group such as a divinylamide group, a dipropenylamide group, and a dicyclohexenylamide group; an arylalkylamide group such as a dibenzylamide group, a phenylethylamide group, and a phenylpropylamide group; and an arylamide group such as a diphenylamide group and a dinaphthylamide group.

Examples of the silicon-containing group having 1 to 20 carbon atoms include a mono-hydrocarbon-substituted silyl group such as a methylsilyl group and a phenylsilyl group; a dihydrocarbon-substituted silyl group such as a dimethylsilyl group and a diphenylsilyl group; a trihydrocarbon-substituted silyl group such as a trimethylsilyl group, a triethylsilyl group, a tripropylsilyl group, a tricyclohexylsilyl group, a triphenylsilyl group, a dimethylphenylsilyl group, a methyldiphenylsilyl group, a tritolylsilyl group, and a trinaphthylsilyl group; a hydrocarbon-substituted silyl ether group such as a trimethylsilyl ether group; a silicon-substituted alkyl group such as a trimethylsilylmethyl group; and a silicon-substituted aryl group such as a trimethylsilylphenyl group. Above all, a trimethylsilylmethyl group, a phenyldimethylsilylethyl group, and the like are preferred.

Examples of the phosphide group having 1 to 40 carbon atoms include a dialkyl phosphide group such as a dimethyl phosphide group, a diethyl phosphide group, a dipropyl phosphide group, a dibutyl phosphide group, a dihexyl phosphide group, a dicyclohexyl phosphide group, and a dioctyl phosphide group; a dialkenyl phosphide group such as a divinyl phosphide group, a dipropenyl phosphide group, and a dicyclohexenyl phosphide group; a bis(arylalkyl) phosphide group such as a dibenzyl phosphide group, a bis(phenylethyl) phosphide group, and a bis(phenylpropyl) phosphide group; and a diaryl phosphide group such as a diphenyl phosphide group, a ditolyl phosphide group, a bis(dimethylphenyl) phosphide group, a bis(trimethylphenyl) phosphide group, a bis(ethylphenyl) phosphide group, a bis(propylphenyl) phosphide group, a bis(biphenyl) phosphide group, a bis(naphthyl) phosphide group, a bis(methylnaphthyl) phosphide group, a bis(anthracenyl) phosphide group, and a bis(phenanthryl) phosphide group.

Examples of the sulfide group having 1 to 20 carbon atoms include an alkyl sulfide group such as a methyl sulfide group, an ethyl sulfide group, a propyl sulfide group, a butyl sulfide group, a hexyl sulfide group, a cyclohexyl sulfide group, and an octyl sulfide group; an alkenyl sulfide group such as a vinyl sulfide group, a propenyl sulfide group, and a cyclohexenyl sulfide group; an arylalkyl sulfide group such as a benzyl sulfide group, a phenylethyl sulfide group, and a phenylpropyl sulfide group; and an aryl sulfide group such as a phenyl sulfide group, a tolyl sulfide group, a dimethylphenyl sulfide group, a trimethylphenyl sulfide group, an ethylphenyl sulfide group, a propylphenyl sulfide group, a biphenyl sulfide group, a naphthyl sulfide group, a methylnaphthyl sulfide group, an anthracenyl sulfide group, and a phenanthryl sulfide group.

Examples of the acyl group having 1 to 20 carbon atoms include an alkylacyl group such as a formyl group, an acetyl group, a propionyl group, a butyryl group, a valeryl group, a palmitoyl group, a stearoyl group, and an oleoyl group; an arylacyl group such as a benzoyl group, a toluoyl group, a salicyloyl group, a cinnamoyl group, a naphthoyl group, and a phthaloyl group; and an oxalyl group, a malonyl group, and a succinyl group, which are derived from oxalic acid, malonic acid, and succinic acid, each being a dicarboxylic acid, respectively.

On the other hand, Y represents a Lewis base, and in the case where plural Ys are present, plural Y's may be the same as or different from each other and may be crosslinked with any other Y, $E^1$, $E^2$, or X. Specific examples of the Lewis base represented by Y include amines, ethers, phosphines, and thioethers.

Examples of the amines include amines having 1 to 20 carbon atoms, and specific examples thereof include alkylamines such as methylamine, ethylamine, propylamine, butylamine, cyclohexylamine, methylethylamine, dimethylamine, diethylamine, dipropylamine, dibutylamine, dicyclohexylamine, and methylethylamine; alkenylamines such as vinylamine, propenylamine, cyclohexenylamine, divinylamine, dipropenylamine, and dicyclohexenylamine; arylalkylamines such as phenylamine, phenylethylamine, and phenylpropylamine; and arylamines such as diphenylamine and dinaphthylamine.

Examples of the ethers include aliphatic monoether compounds such as methyl ether, ethyl ether, propyl ether, isopropyl ether, butyl ether, isobutyl ether, n-amyl ether, and isoamyl ether; aliphatic mixed ether compounds such as methylethyl ether, methylpropyl ether, methylisopropyl ether, methyl-n-amyl ether, methylisoamyl ether, ethylpropyl ether, ethylisopropyl ether, ethylbutyl ether, ethylisobutyl ether, ethyl-n-amyl ether, and ethylisoamyl ether; aliphatic unsaturated ether compounds such as vinyl ether, allyl ether, methylvinyl ether, methylallyl ether, ethylvinyl ether, and ethylallyl ether; aromatic ether compounds such as anisole, phenetole, phenyl ether, benzyl ether, phenylbenzyl ether, α-naphthyl ether, and β-naphthyl ether; and cyclic ether compounds such as ethylene oxide, propylene oxide, trimethylene oxide, tetrahydrofuran, tetrahydropyran, and dioxane.

Examples of the phosphines include phosphines having 1 to 30 carbon atoms. Specific examples thereof include alkyl phosphines including monohydrocarbon-substituted phosphines such as methyl phosphine, ethyl phosphine, propyl phosphine, butyl phosphine, hexyl phosphine, cyclohexyl phosphine, and octyl phosphine; dihydrocarbon-substituted phosphines such as dimethyl phosphine, diethyl phosphine, dipropyl phosphine, dibutyl phosphine, dihexyl phosphine, dicyclohexyl phosphine, and dioctyl phosphine; trihydrocarbon-substituted phosphines such as trimethyl phosphine, triethyl phosphine, tripropyl phosphine, tributyl phosphine, trihexyl phosphine, tricyclohexyl phosphine, and trioctyl phosphine; monoalkenyl phosphines such as vinyl phosphine, propenyl phosphine, and cyclohexenyl phosphine; dialkenyl phosphines in which two hydrogen atoms of phosphine are each substituted with alkenyl; trialkenyl phosphines in which three hydrogen atoms of phosphine are each substituted with alkenyl; and arylphosphines including arylalkyl phosphines such as benzyl phosphine, phenylethyl phosphine, and phenylpropyl phosphine; diarylalkyl phosphines or aryldialkyl phosphines in which three hydrogen atoms of phosphine are each substituted with aryl or alkenyl; phenyl phosphine, tolyl phosphine, dimethylphenyl phosphine, trimethylphenyl phosphine, ethylphenyl phosphine, propylphenyl phosphine, biphenyl phosphine, naphthyl phosphine, methylnaphthyl phosphine, anthracenyl phosphine, and phenanthryl phosphine; di(alkylaryl) phosphines in which two hydrogen atoms of phosphine are each substituted with alkylaryl; and tri(alkylaryl)phosphines in which three hydrogen atoms of phosphine are each substituted with alkylaryl. Examples of the thioethers include the above-mentioned sulfides.

Next, $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other. Examples of such a crosslinking group include a group represented by the following general formula (II).

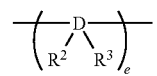

(II)

wherein D is carbon, silicon, or tin. $R^2$ and $R^3$ are each a hydrogen atom or a hydrocarbon group having 1 to 20 carbon atoms, and may be the same as or different from each other, or may be bonded to each other to form a ring structure. e represents an integer of 1 to 4.

Specific examples thereof include a methylene group, an ethylene group, an ethylidene group, a propylidene group, an isopropylidene group, a cyclohexylidene group, a 1,2-cyclohexylene group, a vinylidene (CH$_2$=C=) group, a dimethylsilylene group, a diphenylsilylene group, a methylphenylsilylene group, a dimethylgermylene group, a dimethylstannylene group, a tetramethyldisilylene group, and a diphenyldisilylene group. Among these, an ethylene group, an isopropylidene group, and a dimethylsilylene group are preferred.

q is an integer of 1 to 5 and represents [(the atomic valence of M)−2], and r represents an integer of 0 to 3.

Specific examples of the transition metal compound represented by the general formula (I) include the specific examples described in WO 02/16450 as preferred examples also in the present invention.

More preferred specific examples thereof include (1,2'-dimethylsilylene)(2,1'-dimethylsilylene)bis(indenyl)zirconium dichloride (hereinafter also referred to as "complex C"), (1,2'-dimethylsilylene)(2,1'-dimethylsilylene)(indenyl)(3-trimethylsilylmethylindenyl)zirconium dichloride (hereinafter also referred to as "complex A"), and (1,2'-dimethylsilylene)(2,1'-dimethylsilylene)bis(3-trimethylsilylmethylindenyl)zirconium dichloride (hereinafter also referred to as "complex B").

With respect to the propylene-based polymer, its stereoregularity [mmmm] can be controlled according to the structure of the transition metal compound to be used when carrying out production. The order of the obtained stereoregularity [mmmm] of the propylene-based polymer obtained using the above complexes A to C is as follows: complex C>complex A>complex B. That is, in order to increase the stereoregularity [mmmm] of the polymer, the steric hindrance of a substituent at position 3 of an indenyl-based ligand of a doubly crosslinked complex may be decreased. By removing the substituent at position 3 of an indene ring of the indenyl ligand, the growth of the polymer is no longer sterically hindered at this position, and thus, the stereoregularity increases.

Next, any compound can be used as the component (B-1) in the components (B) as long as it is a compound which can be reacted with the transition metal compound as the component (A) described above to form an ionic complex, however, a compound represented by the following general formula (III) or (IV) can be preferably used:

   (III)

   (IV)

wherein, $L^2$ is $M^2$, $R^{11}R^{12}M^3$, $R^{13}{}_3C$, or $R^{14}M^3$.

In the above general formulae (III) and (IV), $L^1$ represents a Lewis base, [Z]— represents a non-coordinating anion $[Z^1]$— or $[Z^2]$—.

$[Z^1]$— represents an anion in which plural groups are bonded to an element, that is, $[M^1G^1G^2 \ldots G^f]$-. Here, $M^1$ represents an element of Groups 5 to 15 of the Periodic Table, preferably an element of Groups 13 to 15 of the Periodic Table. $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a heteroatom-containing hydrocarbon group having 2 to 20 carbon atoms. Two or more groups of $G^1$ to $G^f$ may form a ring. f represents an integer of [(the atomic valence of the central metal $M^1$)+1].

$[Z^2]$— represents a conjugate base of a Bronsted acid alone in which the logarithm (pKa) of an inverse number of an acid dissociation constant is −10 or less or a combination of a Bronsted acid and a Lewis acid, or a conjugate base of an acid generally defined as an ultrastrong acid. Further, a Lewis base may be coordinated.

$R^{10}$ represents a hydrogen atom, an alkyl group having 1 to 20 carbon atoms, an aryl group having 6 to 20 carbon atoms, an alkylaryl group, or an arylalkyl group.

$R^{11}$ and $R^{12}$ each represent a cyclopentadienyl group, a substituted cyclopentadienyl group, an indenyl group, or a fluorenyl group.

$R^{13}$ represents an alkyl group having 1 to 20 carbon atoms, an aryl group, an alkylaryl group, or an arylalkyl group.

$R^{14}$ represents a large cyclic ligand such as tetraphenylporphyrin or phthalocyanine. k is the ionic valence of each of $[L^1-R^{10}]$ and $[L^2]$, and represents an integer of 1 to 3, a represents an integer of 1 or more, and b is (k×a). $M^2$ includes an element of Groups 1 to 3, 11 to 13, and 17 of the Periodic Table, and $M^3$ represents an element of Groups 7 to 12 of the Periodic Table.

Here, specific examples of $L^1$ include amines such as ammonia, methylamine, aniline, dimethylamine, diethylamine, N-methylaniline, diphenylamine, N, N-dimethylaniline, trimethylamine, triethylamine, tri-n-butylamine, methyldiphenylamine, pyridine, p-bromo-N,N-dimethylaniline, and p-nitro-N,N-dimethylaniline; phosphines such as triethylphosphine, triphenylphosphine; and diphenylphosphine, thioethers such as tetrahydrothiophene; esters such as ethyl benzoate; and nitriles such as acetonitrile and benzonitrile.

Specific examples of $R^{10}$ include hydrogen, a methyl group, an ethyl group, a benzyl group, and a trityl group. Specific examples of $R^{11}$ and $R^{12}$ include a cyclopentadienyl group, a methylcyclopentadienyl group, an ethylcyclopentadienyl group, and a pentamethylcyclopentadienyl group. Specific examples of $R^{13}$ include a phenyl group, a p-tolyl group, and a p-methoxyphenyl group. Specific examples of $R^{14}$ include teteraphenylporphine, phthalocyanine, allyl, and metallyl. Specific examples of $M^2$ include Li, Na, K, Ag, Cu, Br, I, and $I_3$. Specific examples of $M^3$ include Mn, Fe, Co, Ni, and Zn.

Further, in $[Z^1]$—, that is, $[M^1G^1G^2 \ldots G^f]$, specific examples of $M^1$ include B, Al, Si, P, As, and Sb, and preferred examples thereof include B and Al. Specific examples of $G^1$, $G^2$ to $G^f$ include a dialkylamino group such as a dimethylamino group and a diethylamino group; an alkoxy group or an aryloxy group such as a methoxy group, an ethoxy group, an n-butoxy group, and a phenoxy group; a hydrocarbon group such as a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group, and a 3,5-dimethylphenyl group; a halogen atom such as fluorine, chlorine, bromine, and iodine; a heteroatom-containing hydrocarbon group such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, and a bis(trimethylsilyl)methyl group; and an organic metalloid group such as a pentamethylantimony group, a trimethylsilyl group, a trimethylgermyl group, a diphenylarsine group, a dicyclohexylantimony group, and diphenylboron.

Also, specific examples of the non-coordinating anion, that is, the conjugate base $[Z^2]$— of a Bronsted acid alone having a pKa of −10 or less or a combination of a Bronsted acid with a Lewis acid include a trifluoromethanesulfonic acid anion $(CF_3SO_3)$—, a bis(trifluoromethanesulfonyl)methyl anion, a bis(trifluoromethanesulfonyl)benzyl anion, bis(trifluoromethanesulfonyl)amide, a perchloric acid anion $(ClO_4)$—, a trifluoroacetic acid anion $(CF_3CO_2)$—, a hexafluoroantimony anion $(SbF_6)$—, a fluorosulfonic acid anion $(FSO_3)$—, a chlorosulfonic acid anion $(ClSO_3)$—, a fluorosulfonic acid anion/an antimony pentafluoride $(FSO_3/SbF_5)$—, a fluorosulfonic acid anion/arsenic pentafluoride (FSO$_3$/AsF$_5$)—, and trifluoromethanesulfonic acid/antimony pentafluoride (CF$_3$SO$_3$/SbF$_5$)—.

Specific examples of the ionic compound which is reacted with the transition metal compound as the component (A) described above to form an ionic complex, that is, the compound as the component (B-1) include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenylborate), benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis [bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate.

As (B-1), one type may be used or two or more types may be used in combination.

On the other hand, examples of the aluminoxane as the component (B-2) include a chain aluminoxane represented by the general formula (V):

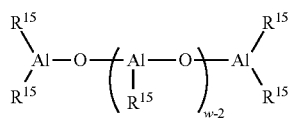

(V)

wherein R$^{15}$ represents a hydrocarbon group having 1 to 20 carbon atoms, preferably 1 to 12 carbon atoms, such as an alkyl group, an alkenyl group, an aryl group, or an arylalkyl group or a halogen atom; and w represents an average polymerization degree and is an integer of usually 2 to 50, preferably 2 to 40, provided that the respective R$^{15}$'s may be the same as or different from each other, and a cyclic aluminoxane represented by the general formula (VI):

(VI)

wherein R$^{15}$ and w are the same as those in the above general formula (V).

Examples of the production method for the aluminoxane described above include a method in which alkylaluminum is brought into contact with a condensing agent such as water, but a means thereof is not particularly limited, and they may be reacted according to a known method. Examples of the method include (i) a method in which an organic aluminum compound is dissolved in an organic solvent, and then the resulting solution is brought into contact with water, (ii) a method in which an organic aluminum compound is first added when carrying out polymerization, and then water is added thereto, (iii) a method in which an organic aluminum compound is reacted with crystal water contained in a metal salt or the like, or water adsorbed on an inorganic substance or an organic substance, and (iv) a method in which trialkylaluminum is reacted with tetraalkyldialuminoxane and the reaction product is further reacted with water. The aluminoxane may be an aluminoxane which is insoluble in toluene.

Among these aluminoxanes, one type may be used or two or more types may be used in combination.

It is desired that the use proportion of the catalyst component (A) to the catalyst component (B) is in the range of preferably 10:1 to 1:100, more preferably 2:1 to 1:10 in terms of molar ratio when the compound (B-1) is used as the catalyst component (B), and if it deviates from the above range, the catalyst cost per unit mass of the polymer increases, so that it is not practical. When the compound (B-2) is used, it is desired that the use proportion is in the range of preferably 1:1 to 1:1,000,000, more preferably 1:10 to 1:10,000 in terms of molar ratio. If it deviates from the above range, the catalyst cost per unit mass of the polymer increases, so that it is not practical. Further, as the catalyst component (B), (B-1) and (B-2) can be used alone or two or more types can be used in combination.

In the polymerization catalyst in the above production method, an organic aluminum compound as a component (C) can be used in addition to the component (A) and the component (B) described above.

Here, as the organic aluminum compound serving as the component (C), a compound represented by the general formula (VII) is used:

(VII)

wherein, R$^{16}$ represents an alkyl group having 1 to 10 carbon atoms, J represents a hydrogen atom, an alkoxy group having 1 to 20 carbon atoms, an aryl group having 6 to 20 carbon atoms, or a halogen atom, and v is an integer of 1 to 3.

Specific examples of the compound represented by the above general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

Among these organic aluminum compounds, one type may be used or two or more types may be used in combination.

In the production method, preliminary contact can also be carried out using the component (A), the component (B), and the component (C) described above. The preliminary contact can be carried out by, for example, bringing the component (B) into contact with the component (A), but the method is not particularly limited, and a known method can be used. This preliminary contact is effective in the reduction in the catalyst cost due to the improvement of the catalyst activity, the reduction in the use proportion of the component (B) which is a promoter, etc. Further, by bringing the component (A) into contact with the component (B-2), an effect of improving the molecular weight can be exhibited in addition to the effect described above. The preliminary contact temperature is usually from −20° C. to 200° C., preferably from −10° C. to 150° C., more preferably from 0° C. to 80° C. In the preliminary contact, an aliphatic hydrocarbon, an aromatic hydrocarbon, or the like can be used as an inert hydrocarbon serving as a solvent. Among these, an aliphatic hydrocarbon is particularly preferred.

It is desired that the use proportion of the catalyst component (A) to the catalyst component (C) is in the range of preferably 1:1 to 1:10,000, more preferably 1:5 to 1:2,000, further more preferably 1:10 to 1:1,000 in terms of molar ratio. By using the catalyst component (C), the polymerization activity per transition metal can be improved, however, if the amount thereof is too much, the organic aluminum compound is not only wasted, but also remains in a large amount in the polymer, and therefore, the excessive amount thereof is not preferred.

In the present invention, at least one of the catalyst components can be carried on a suitable carrier and used. The type of the carrier is not particularly limited, and any of an inorganic oxide carrier, an inorganic carrier other than the inorganic oxide carrier, and an organic carrier can be used. However, in particular, an inorganic oxide carrier or an inorganic carrier other than the inorganic oxide carrier is preferred.

Specific examples of the inorganic oxide carrier include $SiO_2$, $Al_2O_3$, MgO, $ZrO_2$, $TiO_2$, $Fe_2O_3$, $B_2O_3$, CaO, ZnO, BaO, $ThO_2$, and mixtures thereof such as silica alumina, zeolite, ferrite, and glass fiber. Among these, $SiO_2$ and $Al_2O_3$ are particularly preferred. The inorganic oxide carrier described above may contain a small amount of a carbonate, a nitrate, a sulfate, or the like.

On the other hand, examples of the carrier other than those described above include magnesium compounds represented by the general formula: $MgR^{17}_xX^1_y$ typified by $MgCl_2$, $Mg(OC_2H_5)_2$, and the like, and complex salts thereof. Here, $R^{17}$ represents an alkyl group having 1 to 20 carbon atoms, an alkoxy group having 1 to 20 carbon atoms, or an aryl group having 6 to 20 carbon atoms, $X^1$ represents a halogen atom or an alkyl group having 1 to 20 carbon atoms, x is 0 to 2, y is 0 to 2, and x+y=2. The respective $R^{17}$'s or the respective $X^1$'s may be the same as or different from each other.

Further, examples of the organic carrier include polymers such as polystyrene, styrene-divinylbenzene copolymers, polyethylene, poly(1-butene), substituted polystyrene, and polyallylate, as well as starch and carbon.

As the carrier to be used in the production method described above, $MgCl_2$, $MgCl(OC_2H_5)$, $Mg(OC_2H_5)_2$, $SiO_2$, $Al_2O_3$, and the like are preferred. The properties of the carrier vary depending on the type thereof and the production method, however, the average particle diameter is usually from 1 to 300 μm, preferably from 10 to 200 μm, more preferably from 20 to 100 μm.

If the particle diameter is small, a fine powder in the polymer increases, and if the particle diameter is large, a coarse particle in the polymer increases to cause a reduction in the bulk density or the clogging of a hopper.

The carrier has a specific surface area of usually 1 to 1,000 $m^2/g$, preferably 50 to 500 $m^2/g$, and a pore volume of usually 0.1 to 5 $cm^3/g$, preferably 0.3 to 3 $cm^3/g$.

If either of the specific surface area and the pore volume deviates from the above range, the catalyst activity decreases in some cases. The specific surface area and the pore volume can be determined, for example, from the volume of adsorbed nitrogen gas according to a BET method.

Further, in the case where the carrier is an inorganic oxide carrier, it is desired that the carrier is preferably used after it is fired at usually 150 to 1,000° C., preferably 200 to 800° C.

In the case where at least one of the catalyst components is carried on the carrier described above, it is desired to carry at least one of the catalyst component (A) and the catalyst component (B), preferably both of the catalyst component (A) and the catalyst component (B) on the carrier.

The method for carrying at least one of the component (A) and the component (B) on the carrier is not particularly limited, however, for example, (i) a method in which at least one of the component (A) and the component (B) is mixed with the carrier, (ii) a method in which the carrier is treated with an organic aluminum compound or a halogen-containing silicon compound, and then at least one of the component (A) and the component (B) is mixed therewith in an inert solvent, (iii) a method in which the carrier, the component (A) and/or the component (B), and an organic aluminum compound or a halogen-containing silicon compound are reacted with one another, (iv) a method in which the component (A) or the component (B) is carried on the carrier, and then the component (B) or the component (A) is mixed therewith, (v) a method in which a catalytic reaction product of the component (A) and the component (B) is mixed with the carrier, (vi) a method in which the carrier is allowed to coexist in the catalytic reaction of the component (A) and the component (B), or the like can be used.

In the reactions in the above (iv), (v), and (vi), it is also possible to add the organic aluminum compound as the component (C).

In the present invention, the catalyst may be prepared by irradiation with an elastic wave when the components (A), (B), and (C) described above are brought into contact. As the elastic wave, generally a sonic wave, particularly preferably an ultrasonic wave can be used. To be specific, an ultrasonic wave with a frequency of 1 to 1,000 kHz, preferably an ultrasonic wave with a frequency of 10 to 500 kHz can be used.

The catalyst thus obtained may be used for polymerization after the solvent is evaporated off and the catalyst in the form of a solid is taken out or may be used for polymerization as it is.

Further, in the present invention, the catalyst can be produced by performing an operation of carrying at least one of the component (A) and the component (B) on the carrier in the polymerization system. For example, a method in which at least one of the component (A) and the component (B), and the carrier, and, if necessary, the organic aluminum compound as the component (C) are added, and an olefin such as ethylene is added at an atmospheric pressure to 2 MPa (gauge) to carry out preliminary polymerization at −20 to 200° C. for about one minute to two hours, thereby forming catalyst particles can be used.

In the present invention, it is desired that the use proportion of the component (B-1) to the carrier is preferably from 1:5 to 1:10,000, more preferably from 1:10 to 1:500 in terms of mass ratio, and the use proportion of the component (B-2) to the carrier is preferably from 1:0.5 to 1:1,000, more preferably from 1:1 to 1:50 in terms of mass ratio. In the case where two or more components as the components (B) are mixed and used, it is desired that the use proportion of each of the components (B) to the carrier is in the above range in terms of mass ratio. Further, it is desired that the use proportion of the component (A) to the carrier is preferably from 1:5 to 1:10,000, more preferably from 1:10 to 1:500 in terms of mass ratio.

If the use proportion of the component (B) [the component (B-1) or the component (B-2)] to the carrier or the use proportion of the component (A) to the carrier deviates from the above range, the activity decreases in some cases. The thus prepared polymerization catalyst of the present invention has an average particle diameter of usually 2 to 200 μm, preferably 10 to 150 μm, particularly preferably 20 to 100 μm, and has a specific surface area of usually 20 to 1,000 $m^2/g$, preferably 50 to 500 $m^2/g$. If the average particle diameter is less than 2 μm, a fine powder in the polymer increases in some cases, and if the average particle diameter exceeds 200 μm, a coarse particle in the polymer increases in some cases. If the specific surface area is less than 20 $m^2/g$, the activity decreases in some cases, and if the specific surface area exceeds 1,000 $m^2/g$, the bulk density of the polymer decreases in some cases. Further, in the catalyst of the present invention, the amount of the transition metal in 100 g of the carrier is usually from 0.05 to 10 g, particularly preferably from 0.1 to 2 g. If the amount of the transition metal is outside of the above range, the activity decreases in some cases.

An industrially advantageous polymer having a high bulk density and an excellent particle size distribution can be obtained by carrying the catalyst on the carrier in the manner described above.

As the propylene-based polymer of the present invention, by using the polymerization catalyst described above, a propylene homopolymer can be produced by homopolymerization of propylene, or a propylene copolymer can be produced by copolymerization of propylene and ethylene and/or an α-olefin having 4 or more carbon atoms.

In this case, the polymerization method is not particularly limited, and any method such as a slurry polymerization method, a gas-phase polymerization method, a bulk polymerization method, a solution polymerization method, or a suspension polymerization method may be used, however, a slurry polymerization method and a gas-phase polymerization method are particularly preferred. Further, from the viewpoint of the ease of control of the reaction, a solution polymerization method is particularly preferred.

With respect to the polymerization conditions, the polymerization temperature is usually from −100 to 250° C., preferably from −50 to 200° C., more preferably from 0 to 130° C. By lowering the polymerization temperature, the stereoregularity [mmmm] of the polymer is increased. It is considered that by lowering the polymerization temperature, the vibration of the molecule of the catalyst becomes smaller, so that when a propylene molecule is inserted, the insertion direction is easily controlled.

With respect to the use proportion of the catalyst to the reaction starting material, the starting material monomer/the component (A) described above (molar ratio) is preferably from $10^5$ to $10^8$, particularly preferably from $10^6$ to $10^7$. The polymerization time is usually from 5 minutes to 10 hours, and the reaction pressure is preferably from an atmospheric pressure to 3 MPa (gauge), more preferably from an atmospheric pressure to 2.5 MPa (gauge), further more preferably from an atmospheric pressure to 2 MPa (gauge). By adjusting the reaction pressure, the meso pentad fraction can be controlled. By increasing the propylene pressure when carrying out polymerization, the stereoregularity [mmmm] is increased. When the propylene partial pressure is increased, a possibility that a propylene molecule is coordinated is increased, and therefore, a possibility that a coordination site on a transition metal is empty is decreased. Accordingly, the racemization which is caused by β-hydrogen elimination from a growing polymer chain and the insertion thereof in a transition metal-H bond can be prevented, and thus, the stereoregularity is considered to increase. More specifically, if a coordination site on a transition metal atom is empty, β-hydrogen elimination from the polymer chain is caused during this period and chirality is lost when the polymer chain is coordinated to a complex through a double bond. A probability of returning to the original conformation is 0.5 after the polymer chain is re-inserted between the transition metal and a hydride and this is the cause for a decrease in stereoregularity.

Examples of the method for controlling the molecular weight of the polymer include selection of the type of the respective catalyst components, the use amount, or the polymerization temperature, and polymerization in the presence of hydrogen.

In the case of using a polymerization solvent, for example, an aromatic hydrocarbon such as benzene, toluene, xylene, or ethylbenzene; an alicyclic hydrocarbon such as cyclopentane, cyclohexane, or methylcyclohexane; an aliphatic hydrocarbon such as pentane, hexane, heptane, or octane; a halogenated hydrocarbon such as chloroform or dichloromethane, or the like can be used. Among these solvents, one type may be used alone or two or more types may be used in combination. Further, a monomer such as an α-olefin may be used as the solvent. The polymerization can be carried out without using a solvent depending on the polymerization method.

In the polymerization, preliminary polymerization can be carried out using the polymerization catalyst described above. The preliminary polymerization can be carried out by bringing, for example, a small amount of an olefin into contact with the solid catalyst component. However, the method is not particularly limited, and a known method can be used. The olefin to be used for the preliminary polymerization is not particularly limited, and for example, ethylene, an α-olefin having 3 to 20 carbon atoms, a mixture thereof, or the like can be used. However, it is advantageous to use the same olefin as used in the polymerization.

The preliminary polymerization temperature is usually from −20 to 200° C., preferably from −10 to 130° C., more preferably from 0 to 80° C. In the preliminary polymerization, an aliphatic hydrocarbon, an aromatic hydrocarbon, a monomer, or the like can be used as a solvent. Among these, an aliphatic hydrocarbon is particularly preferred. The preliminary polymerization may be carried out without using a solvent.

In the preliminary polymerization, it is desired to control the conditions so that the limiting viscosity [η] (measured in decalin at 135° C.) of the preliminary polymerization product is 0.2 dL/g or more, particularly 0.5 dL/g or more, and the amount of the preliminary polymerization product per millimole of the transition metal component in the catalyst is from 1 to 10,000 g, particularly from 10 to 1,000 g.

The propylene-based polymer of the present invention can be applied to the field of adhesives and the like. In particular, as described below, by blending the propylene-based polymer of the present invention in a base polymer as a modifier (a heat creep resistance improver), a favorable hot-melt adhesive having favorable heat creep resistance can be provided. That is, preferred examples of a mode of use of the propylene-based polymer of the present invention include use of the propylene-based polymer of the present invention for modifying a hot-melt adhesive, more preferred examples thereof include use of the propylene-based polymer of the present invention for improving the heat creep resistance of a hot-melt adhesive.

[Hot-Melt Adhesive]

The hot-melt adhesive of the present invention contains an ethylene-based polymer (A) from the viewpoint of the adhesiveness, and the propylene-based polymer (B) of the present invention from the viewpoint of the improvement of the heat creep resistance.

From the viewpoint of the improvement of the heat creep resistance, the content of the propylene-based polymer (B) in the hot-melt adhesive of the present invention is preferably from 1 to 50% by mass, more preferably from 3 to 30% by mass, further more preferably from 5 to 15% by mass.

The hot-melt adhesive of the present invention contains the propylene-based polymer (B) of the present invention described above in an amount of preferably 1 to 30 parts by mass, more preferably 5 to 25 parts by mass, further more preferably 10 to 20 parts by mass with respect to 100 parts by mass of the ethylene-based polymer (A) from the viewpoint of the balance between favorable adhesiveness and favorable heat creep resistance. By blending the propylene-based polymer (B) of the present invention as a modifier in the ethylene-based polymer (A) serving as a base polymer, the hot-melt adhesive of the present invention has an excellent balance between favorable adhesiveness and favorable heat creep resistance.

(Ethylene-Based Polymer (A))

The ethylene-based polymer (A) to be used in the present invention is a base polymer of the hot-melt adhesive of the present invention, and specific examples thereof include polyethylene and copolymers of ethylene and an olefin having 3 to 10 carbon atoms. From the viewpoint of the adhesiveness, the ethylene-based polymer (A) is preferably an ethylene-α-olefin copolymer. Specific examples of the α-olefin include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In the present invention, among these, one type or two or more types can be used. Among these α-olefins, 1-octene is preferred. From the viewpoint of the adhesiveness, the ethylene-based polymer (A) to be used in the present invention is more preferably an ethylene-1-octene copolymer, further more preferably an ethylene-1-octene copolymer containing 63 to 65% by mass of a structural unit derived from ethylene and 35 to 37% by mass of a structural unit derived from 1-octene.

From the viewpoint of the heat creep resistance, the melting point of the ethylene-based polymer (A) to be used in the present invention is preferably from 60 to 100° C., more preferably from 60 to 75° C. The melting point of the ethylene-based polymer (A) can be measured by differential scanning calorimetry.

Examples of commercially available products of the ethylene-based polymer (A) to be used in the present invention include Exact series (manufactured by Exxon Mobil Corporation) and Affinity Polymer series (manufactured by The Dow Chemical Company), and more preferred examples thereof include Affinity GA1950 (manufactured by The Dow Chemical Company) (all are trade names).

(Tackifier Resin (C))

The hot-melt adhesive of the present invention may contain a tackifier resin (C).

Examples of the tackifier resin (C) include materials which are composed of a rosin derivative resin, a polyterpene resin, a petroleum resin, an oil-soluble phenolic resin, or the like and are in the form of a solid, a semi-solid, or a liquid at normal temperature. Among these materials, one type may be used alone or two or more types may be used in combination. In the present invention, in consideration of the compatibility with the base polymer, it is preferred to use a hydrogenated material. In particular, a hydrogenated petroleum resin material having excellent heat stability is more preferred.

Examples of commercially available products of the tackifier resin (C) include I-MARV P-125, I-MARV P-100, and I-MARV P-90 (all manufactured by Idemitsu Kosan Co., Ltd.), Yumex 1001 (manufactured by Sanyo Chemical Industries, Ltd.), Hi-Rez T 1115 (manufactured by Mitsui Chemicals, Incorporated), Clearon K 100 (manufactured by Yasuhara Chemical Co., Ltd.), ECR 227 and Escorez 2101 (both manufactured by Tonex Co., Ltd.), Arkon P-100 (manufactured by Arakawa Chemical Industries, Ltd.), Regalrez 1078 (manufactured by Hercules, Inc.), and Eastotac H-130R (manufactured by Eastman Chemical Company) (all are trade names).

From the viewpoint of the improvement of the adhesiveness and also the improvement of the wettability to an adherend due to a decrease in the viscosity, the content of the tackifier resin (C) in the hot-melt adhesive of the present invention is preferably from 50 to 200 parts by mass, more preferably from 70 to 150 parts by mass, further more preferably from 80 to 120 parts by mass with respect to 100 parts by mass of the ethylene-based polymer (A).

(Wax (D))

The hot-melt adhesive of the present invention may contain a wax (D).

Examples of the wax (D) include animal waxes, vegetable waxes, carnauba waxes, candelilla waxes, Japan waxes, beeswaxes, mineral waxes, petroleum waxes, paraffin waxes, microcrystalline waxes, petrolatum, higher fatty acid waxes, higher fatty acid ester waxes, and Fischer-Tropsch waxes.

From the viewpoint of the improvement of the flexibility and also the improvement of the wettability due to a decrease in the viscosity, the content of the wax (D) in the hot-melt adhesive of the present invention is preferably from 50 to 200 parts by mass, more preferably from 60 to 150 parts by mass, further more preferably from 70 to 120 parts by mass with respect to 100 parts by mass of the ethylene-based polymer (A). The viscosity of the hot-melt adhesive decreases with the increase in the addition amount of the wax.

(Additive)

Further, the hot-melt adhesive of the present invention may contain a variety of additives such as a plasticizer, an inorganic filler, and an antioxidant as needed.

Examples of the plasticizer include paraffin-based process oils, naphthene-based process oils, phthalate esters, adipate esters, fatty acid esters, glycols, and epoxy-based polymer plasticizers.

Examples of the inorganic filler include clay, talc, calcium carbonate, and barium carbonate.

Examples of the antioxidant include phosphorus-based antioxidants such as tris(nonylphenyl) phosphite, distearyl pentaerythritol diphosphite, Adekastab 1178 (manufactured by Adeka Corporation), Sumilizer TNP (manufactured by Sumitomo Chemical Co., Ltd.), Irgafos 168 (manufactured by BASF Co., Ltd.), and Sandstab P-EPQ (manufactured by Sandoz K.K.); phenolic antioxidants such as 2,6-di-t-butyl-4-methylphenol, n-octadecyl-3-(3',5'-di-t-butyl-4'-hydroxyphenyl)propionate, Sumilizer BHT (manufactured by Sumitomo Chemical Co., Ltd.), and Irganox 1010 (manufactured by BASF Co., Ltd.); and sulfur-based antioxidants such as dilauryl-3,3'-thiodipropionate, pentaerythritoltetrakis(3-laurylthiopropionate), Sumilizer TPL (manufactured by Sumitomo Chemical Co., Ltd.), Yoshinox DLTP (manufactured by Yoshitomi Pharmaceutical Industries, Ltd.), and AntiOx L (manufactured by NOF Corporation).

(Production Method for Hot-Melt Adhesive)

The hot-melt adhesive of the present invention can be produced by dry-blending the ethylene-based polymer (A) and the propylene-based polymer (B), and if necessary, the tackifier resin (C), the wax (D), and a variety of additives using a Henschel mixer or the like, and melt-kneading the components using a single-screw or twin-screw extruder, a Plast mill, a Banbury mixer, or the like.

The hot-melt adhesive of the present invention can be favorably used as an adhesive for packaging such as a corrugated cardboard.

(Bonding Method)

The bonding method of the present invention is a method for bonding a base material to another base material, and includes a step of melting the hot-melt adhesive of the present invention and coating the adhesive onto at least one base material, and a step of bonding the other base material to the coated hot-melt adhesive.

EXAMPLES

Next, the present invention will be more specifically described with reference to Examples, but the present invention is by no means limited to these examples.

Synthesis Example 1

Complex A ((1,2'-dimethylsilylene)(2,1'-dimethylsilylene)(indenyl) (3-trimethylsilylmethylindenyl) zirconium dichloride)

(1,2'-Dimethylsilylene)(2,1'-dimethylsilylene)(indenyl) (3-trimethylsilylmethylindenyOzirconium dichloride was synthesized according to the description in Example 5 of Japanese Patent No. 4053993.

Synthesis Example 2

Complex B ((1,2'-dimethylsilylene)(2, 1'-dimethylsilylene)-bis(3-trimethylsilylmethylindenyl)zirconium dichloride)

(1,2'-Dimethylsilylene)(2,1'-dimethylsilylene)-bis(3-trimethylsilylmethylindenyl)zirconium dichloride was synthesized according to the description in Reference Example 1 of Japanese Patent No. 4053993.

Synthesis Example 3

Complex C ((1,2'-dimethylsilylene)(2,1'-dimethylsilylene)-bis(indenyl)zirconium dichloride)

(1,2'-Dimethylsilylene)(2,1'-dimethylsilylene)-bis(indenyl)zirconium dichloride was synthesized according to the description in Example 1 of JP 2000-256411 A.

Production Example 1

Production of Polypropylene 1

To a stainless steel reactor having an internal volume of 0.2 m$^3$ and equipped with a stirrer, n-heptane at 25 L/h, triisobutylaluminum at 25 mmol/h, and further a catalyst component obtained by previously bringing dimethylanilinium tetrakis(pentafluorophenyl)borate, the complex A, triisobutylaluminum, and propylene into contact with one another at 1.2 µmol/h in terms of zirconium were continuously supplied.

Then, propylene and hydrogen were continuously supplied thereto so that a hydrogen concentration in the gas phase was kept at 2.5 mol % and the total pressure in the reactor was kept at 1.0 MPa·G at a polymerization temperature of 65° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 1) was obtained.

Production Example 2

Production of Polypropylene 2

To a stainless steel reactor having an internal volume of 0.2 m$^3$ and equipped with a stirrer, n-heptane at 25 L/h, triisobutylaluminum at 25 mmol/h, and further a catalyst component obtained by previously bringing dimethylanilinium tetrakis(pentafluorophenyl)borate, the complex A, triisobutylaluminum, and propylene into contact with one another at 1.8 µmol/h in terms of zirconium were continuously supplied.

Then, propylene and hydrogen were continuously supplied thereto so that a hydrogen concentration in the gas phase was kept at 1.5 mol % and the total pressure in the reactor was kept at 1.0 MPa·G at a polymerization temperature of 65° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 2) was obtained.

Production Example 3

Production of Polypropylene 3

To a stainless steel reactor having an internal volume of 68 m$^3$ and equipped with a stirrer, n-heptane at 5.2 m$^3$/h, triisobutylaluminum at 0.6 mol/h, and further a catalyst component obtained by previously bringing dimethylanilinium tetrakis(pentafluorophenyl)borate, the complex B, triisobutylaluminum, and propylene into contact with one another at 0.7 mmol/h in terms of zirconium were continuously supplied.

Then, propylene and hydrogen were continuously supplied thereto so that a hydrogen concentration in the gas phase was kept at 5.0 mol % and the total pressure in the reactor was kept at 1.7 MPa·G at a polymerization temperature of 85° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 3) was obtained.

Production Example 4

Production of Polypropylene 4

To a stainless steel reactor having an internal volume of 0.2 m³ and equipped with a stirrer, n-heptane at 25 L/h, triisobutylaluminum at 25 mmol/h, and further a catalyst component obtained by previously bringing dimethylanilinium tetrakis(pentafluorophenyl)borate, the complex C, triisobutylaluminum, and propylene into contact with one another at 1.2 μmol/h in terms of zirconium were continuously supplied.

Then, propylene and hydrogen were continuously supplied thereto so that a hydrogen concentration in the gas phase was kept at 0.66 mol % and the total pressure in the reactor was kept at 0.66 MPa·G at a polymerization temperature of 70° C.

To the thus obtained polymerization solution, Irganox 1010 (trade name, manufactured by BASF Co., Ltd.) was added so that the content thereof in the polymerization solution was 1,000 ppm, and then the solvent was removed, whereby a propylene homopolymer (polypropylene 4) was obtained.

Production Example 5

Production of Polypropylene 5

A propylene homopolymer (polypropylene 5) was obtained in the same manner as in the Production Example 4 except that propylene and hydrogen were continuously supplied so that a hydrogen concentration in the gas phase was kept at 3.5 mol % and the total pressure in the reactor was kept at 0.7 MPa·G at a polymerization temperature of 60° C.

Production Example 6

Production of Polypropylene 6

A propylene homopolymer (polypropylene 6) was obtained in the same manner as in the Production Example 4 except that propylene and hydrogen were continuously supplied so that a hydrogen concentration in the gas phase was kept at 0.66 mol % and the total pressure in the reactor was kept at 0.66 MPa·G at a polymerization temperature of 60° C.

[Evaluation of Stereoregularity: NMR Measurement]

With respect to the polypropylenes 1 to 6 obtained in the Production Examples 1 to 6, the $^{13}$C-NMR spectrum was measured using the following device under the following conditions. The assignment of a peak was carried out in accordance with the method proposed in "Macromolecules, 8, 687 (1975)" by A. Zambelli, et al. The results are shown in Table 1.

Device: $^{13}$C-NMR spectrometer, JNM-EX400 series manufactured by JEOL, Ltd.
Method: proton complete decoupling method
Concentration: 220 mg/mL
Solvent: a mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times <Calculation Formulae>

$$M = m/S \times 100$$

$$R = \gamma/S \times 100$$

$$S = P_{\beta\beta} + P_{\alpha\beta} + P_{\alpha\gamma}$$

S: signal intensity of carbon atoms of side-chain methyl in all propylene units
Pββ: 19.8 to 22.5 ppm
Pαβ: 18.0 to 17.5 ppm
Pαγ: 17.5 to 17.1 ppm
γ: racemic pentad chain: 20.7 to 20.3 ppm
m: meso pentad chain: 21.7 to 22.5 ppm The meso pentad fraction [mmmm] and the racemic meso racemic meso pentad fraction [rmrm] are determined in accordance with the method proposed in "Macromolecules, 6, 925 (1973)" by A. Zambelli et al., and are a meso fraction and a racemic meso racemic meso fraction in a pentad unit in a polypropylene molecular chain measured with the signal of a methyl group in the $^{13}$C-NMR spectrum. The stereoregularity increases with the increase in the meso pentad fraction [mmmm].

[Measurement of Weight-Average Molecular Weight (Mw) and Molecular Weight Distribution (Mw/Mn)]

With respect to the polypropylenes 1 to 6 obtained in the Production Examples 1 to 6, according to the gel permeation chromatography (GPC) method, the weight-average molecular weight (Mw) and the molecular weight distribution (Mw/Mn) were obtained. In the measurement, the following device was used under the following conditions, and the weight-average molecular weight in terms of polystyrene was obtained. The results are shown in Table 1.

<GPC Measuring Device>
Column: TOSO GMHHR-H(S)HT
Detector: RI detector for liquid chromatography, Waters 150C
<Measurement Conditions>
Solvent: 1,2,4-trichlorobenzene
Measurement temperature: 145° C.
Flow rate: 1.0 mL/min
Sample concentration: 2.2 mg/mL
Injection amount: 160 μL
Calibration curve: Universal Calibration
Analysis software: HT-GPC (ver. 1.0)

[Limiting Viscosity (η)]

With respect to the polypropylenes 1 to 6 obtained in the Production Examples 1 to 6, 0.02 to 0.16 g/dL solutions were subjected to measurement at 135° C. using a viscometer (manufactured by RIGO Co., Ltd., trade name: "VMR-053U-PC-F01"), an Ubbelohde type viscosity tube (bulb volume in measurement: 2 to 3 mL, capillary diameter: 0.44 to 0.48 mm), and tetralin as the solvent. The results are shown in Table 1.

[Melting Point (Tm-D)]

With respect to the polypropylenes 1 to 6 obtained in the Production Examples 1 to 6, the melting point (Tm-D) was determined from the peak top of a peak observed on the highest temperature side in a melting endothermic curve obtained by using a differential scanning calorimeter (manufactured by PerkinElmer Co., Ltd., DSC-7), and keeping 10 mg of a sample in a nitrogen atmosphere at −10° C. for 5 minutes, and then raising the temperature at 10° C./min. Further, with respect also to blends of two types of polypropylenes used in Examples 6 to 9, which will be described below, the racemic meso racemic meso pentad fraction [rmrm] and the melting point (Tm-D) were determined in the same manner as described above. The results are shown in Table 1.

duced. With respect to the thus obtained hot-melt adhesives, the following evaluation was carried out.

<Modulus of Elasticity in Tension of Propylene-Based Polymer>

Each of the propylene-based polymers (mixtures in the case of Examples 6 to 9) shown in Table 2-1 and 2-2 was press-molded to prepare a test piece, and the modulus of elasticity in tension of the propylene-based polymer was measured according to JIS K 7113 under the following conditions.

Test piece (No. 2 dumbbell), thickness: 1 mm
Cross head rate: 100 mm/min

TABLE 1

|  | Production Example 1 Polypropylene 1 | Production Example 2 Polypropylene 2 | Production Example 3 Polypropylene 3 | Production Example 4 Polypropylene 4 | Production Example 5 Polypropylene 5 | Production Example 6 Polypropylene 6 |
| --- | --- | --- | --- | --- | --- | --- |
| [mmmm] (mol %) | 62 | 62 | 47 | 70 | 70 | 70 |
| [rmrm] (mol %) | 1.5 | 1.4 | 3.0 | 0.9 | 0.9 | 1.0 |
| Limiting viscosity η (dl/g) | 0.32 | 0.41 | 0.44 | 0.30 | 0.20 | 0.45 |
| Weight-average molecular weight Mw | 36,000 | 51,000 | 51,000 | 32,000 | 14,000 | 51,000 |
| Molecular weight distribution Mw/Mn | 1.9 | 2.0 | 2.0 | 2.3 | 1.9 | 2.4 |
| Melting point Tm-D (° C.) | 103 | 103 | 75 | 117 | 117 | 117 |

|  |  | Example 6 | Example 7 | Example 8 | Example 9 |
| --- | --- | --- | --- | --- | --- |
| Propylene-based polymer (parts by mass) | Polypropylene 3 | 2.5 | 1.25 | 2.5 | 3.75 |
|  | Polypropylene 5 | 2.5 | — | — | — |
|  | Polypropylene 6 | — | 3.75 | 2.5 | 1.25 |
| Melting point Tm-D (° C.) |  | 110 | 113 | 111 | 104 |
| [rmrm] (mol %) |  | 1.8 | 1.3 | 1.7 | 2.4 |

Starting materials used in the production of the following hot-melt adhesives are shown.

<Ethylene-Based Polymer (A) (Base Polymer)> an ethylene-1-octene copolymer (trade name: Affinity GA1950, manufactured by The Dow Chemical Company, weight-average molecular weight: 38,000, 1-octene content: 35 to 37% by weight, melt flow rate: 500 g/10 min)

<Propylene-Based Polymer (B)>

(B-X) an ethylene-propylene copolymer (trade name: Licocene PP 2602, manufactured by Clariant Corporation, ethylene:propylene=15 mol %:85 mol %)

(B-Y) a polypropylene (trade name: Biscol 660-P, manufactured by Sanyo Chemical Industries, Ltd.)

<Tackifier Resin (C)>

(C-1) a hydrogenated derivative of an aliphatic hydrocarbon petroleum resin (trade name: Eastotac H-130R, manufactured by Eastman Chemical Company, softening point: 130° C.)

<Wax (D)>

(D-1) a Fischer-Tropsch wax (trade name: Paraflint H1, manufactured by Sasol Wax GmbH)

Comparative Examples 1 to 6, Examples 1 to 9

Production of Hot-Melt Adhesive

The materials shown in Table 2-1 and 2-2 were put into a sample bottle at the blending ratios shown in Table 2-1 and 2-2 and melted by heating to 180° C. for 30 minutes, followed by sufficiently mixing and stirring the materials with a metal spoon, whereby hot-melt adhesives were pro- Load cell: 100 N
Measurement temperature: 23° C.

<Tensile Elongation at Break of Propylene-Based Polymer>

Each of the propylene-based polymers (mixtures in the case of Examples 6 to 9) shown in Table 2-1 and 2-2 was press-molded to prepare a test piece, and the tensile elongation at break of the propylene-based polymer was measured according to JIS K 7113 under the following conditions.

Test piece (JIS K 7113-No. 2, ½ size dumbbell), thickness: 1 mm
Measurement temperature: 23° C.
Tensile rate: 100 mm/min
Inter-chuck distance: 40 mm <Heat Creep Resistance>

The heat creep resistance was evaluated based on the following constant temperature creep property.

(Constant Temperature Creep)

The constant temperature creep is an index indicating the heat creep resistance of an adhesive, and as the peeling time is longer, the heat creep resistance is higher, and peeling hardly occurs during transportation or the like, and therefore, the longer peeling time is preferred.

The hot-melt adhesive melted by heating to 180° C. was coated onto K-liner corrugated cardboards in a coating amount of 2.8 to 3.2 g/m, and after an open time of 2 seconds, the cardboards were bonded to each other under the conditions that the bonding pressure was 2 kg/25 cm² and the set time was 2 seconds. The bonded test piece was left to stand in an environment at a temperature of 23° C. and a humidity of 50% for 24 hours. Then, a load of 200 g/g/25 cm² was applied to the thus prepared test piece in the stress direction in an environment at a temperature of 60° C. and a humidity of 30%, and a time until the bonded sample was peeled off was measured. The measurement was carried out 5 times, and an average of three measurements excluding the longest and shortest peeling times was determined as the value of the constant temperature creep test.

Examples 1 to 9 using the propylene-based polymer of the present invention have excellent heat creep resistance.

INDUSTRIAL APPLICABILITY

The propylene-based polymer of the present invention can be favorably used in the field of hot-melt adhesives. Further,

TABLE 2-1

| | | Comparative Example 1 | Comparative Example 2 | Comparative Example 3 | Comparative Example 4 | Comparative Example 5 | Comparative Example 6 |
|---|---|---|---|---|---|---|---|
| Composition (parts by mass) | (A) Ethylene-based copolymer *1 | 35 | 35 | 35 | 35 | 35 | 35 |
| | (B) Polypropylene 1 | — | — | — | — | — | — |
| | Polypropylene 2 | — | — | — | — | — | — |
| | Polypropylene 3 | — | 5 | — | — | — | — |
| | Polypropylene 4 | — | — | 5 | — | — | — |
| | Polypropylene 5 | — | — | — | — | — | — |
| | Polypropylene 6 | — | — | — | 5 | — | — |
| | Propylene-based copolymer (B-X) *2 | — | — | — | — | 5 | — |
| | Polypropylene (B-Y) *3 | — | — | — | — | — | 5 |
| | (C) Tackifier resin (C-1) *4 | 35 | 35 | 35 | 35 | 35 | 35 |
| | (D) Wax (D-1) *5 | 30 | 25 | 25 | 25 | 25 | 25 |
| Modulus of elasticity in tension at 23° C. of propylene-based polymer (B) (MPa) | | — | 80 | 370 | 450 | 120 | Could not be measured |
| Elongation at break at 23° C. of propylene-based polymer (B) (%) | | — | 740 | 2 | 580 | 640 | Could not be measured |
| Heat creep resistance 60° C., 30% (min) | | 59 | 38 | 52 | 59 | 29 | 49 |

*1: an ethylene-1-octene copolymer (trade name: Affinity GA1950, manufactured by The Dow Chemical Company)
*2: an ethylene-propylene copolymer (trade name: Licocene PP 2602, manufactured by Clariant Corporation)
*3: a polypropylene (trade name: Biscol 660-P, manufactured by Sanyo Chemical Industries, Ltd.)
*4: a hydrogenated derivative of an aliphatic hydrocarbon petroleum resin (trade name: Eastotac H-130R, manufactured by Eastman Chemical Company)
*5: a Fischer-Tropsch wax (trade name: Paraflint H1, manufactured by Sasol Wax GmbH)

TABLE 2-2

| | | Example 1 | Example 2 | Example 3 | Example 4 | Example 5 | Example 6 | Example 7 | Example 8 | Example 9 |
|---|---|---|---|---|---|---|---|---|---|---|
| Composition (parts by mass) | (A) Ethylene-based copolymer *1 | 35 | 35 | 35 | 30 | 35 | 35 | 35 | 35 | 35 |
| | (B) Polypropylene 1 | 5 | 10 | 10 | — | — | — | — | — | — |
| | Polypropylene 2 | — | — | — | 5 | 5 | — | — | — | — |
| | Polypropylene 3 | — | — | — | — | — | 2.5 | 1.25 | 2.5 | 3.75 |
| | Polypropylene 4 | — | — | — | — | — | — | — | — | — |
| | Polypropylene 5 | — | — | — | — | — | 2.5 | — | — | — |
| | Polypropylene 6 | — | — | — | — | — | — | 3.75 | 2.5 | 1.25 |
| | Propylene-based copolymer (B-X) *2 | — | — | — | — | — | — | — | — | — |
| | Polypropylene (B-Y) *3 | — | — | — | — | — | — | — | — | — |
| | (C) Tackifier resin (C-1) *4 | 35 | 35 | 35 | 35 | 35 | 35 | 35 | 35 | 35 |
| | (D) Wax (D-1) *5 | 25 | 30 | 20 | 30 | 25 | 25 | 25 | 25 | 25 |
| Modulus of elasticity in tension at 23° C. of propylene-based polymer (B) (MPa) | | 270 | 270 | 270 | 270 | 270 | 180 | 310 | 200 | 130 |
| Elongation at break at 23° C. of propylene-based polymer (B) (%) | | 200 | 200 | 200 | 560 | 560 | 520 | 580 | 690 | 700 |
| Heat creep resistance 60° C., 30% (min) | | 83 | 76 | 128 | 122 | 87 | 88 | 83 | 77 | 65 |

*1: an ethylene-1-octene copolymer (trade name: Affinity GA1950, manufactured by The Dow Chemical Company)
*2: an ethylene-propylene copolymer (trade name: Licocene PP 2602, manufactured by Clariant Corporation)
*3: a polypropylene (trade name: Biscol 660-P, manufactured by Sanyo Chemical Industries, Ltd.)
*4: a hydrogenated derivative of an aliphatic hydrocarbon petroleum resin (trade name: Eastotac H-130R, manufactured by Eastman Chemical Company)
*5: a Fischer-Tropsch wax (trade name: Paraflint H1, manufactured by Sasol Wax GmbH)

As compared with the hot-melt adhesives of Comparative Example 1 (for reference), in the case of Comparative Examples 2 to 6, the heat creep resistance is not improved, but deteriorated instead, however, the hot-melt adhesives of the hot-melt adhesive of the present invention can be favorably used as an adhesive for packaging such as corrugated cardboards, and an adhesive for sanitary articles, woodwork, bookbinding, fibers, electrical materials, canning, building, bag making, and the like.

The invention claimed is:

1. A propylene-based polymer, having:
 a modulus of elasticity in tension at 23° C. of 125 MPa to 400 MPa;
 an elongation at break at 23° C. of 100% to 1,000%;
 a stereoregularity [mmmm] of 60 mol % to 80 mol %;
 a weight-average molecular weight (Mw) of 10,000 to 55,000;
 a molecular weight distribution (Mw/Mn) of ≤2.5; and
 a racemic meso racemic meso fraction [rmrm] of <2.5 mol %.

2. The propylene-based polymer according to claim 1, wherein the propylene-based polymer is a propylene homopolymer.

3. A hot-melt adhesive, comprising the propylene-based polymer according to claim 1 in an amount of 1 to 50% by mass and an ethylene-based polymer.

4. The hot-melt adhesive according to claim 3, comprising the propylene-based polymer in an amount of 1 to 30 parts by mass with respect to 100 parts by mass of the ethylene-based polymer.

5. The hot-melt adhesive according to claim 4, wherein the ethylene-based polymer is an ethylene-α-olefin copolymer.

6. The hot-melt adhesive according to claim 4, wherein the ethylene-based polymer is an ethylene-1-octene copolymer.

7. The hot-melt adhesive according to claim 6, wherein the ethylene-1-octene copolymer comprises 63 to 65% by mass of a structural unit derived from ethylene and 35 to 37% by mass of a structural unit derived from 1-octene.

8. The hot-melt adhesive according to claim 3, further comprising a tackifier resin in an amount of 50 to 200 parts by mass and a wax in an amount of 50 to 200 parts by mass with respect to 100 parts by mass of the ethylene-based polymer.

9. A method for bonding a first base material to a second base material, comprising:
 melting the hot-melt adhesive according to claim 3;
 coating the adhesive onto at least one of the first and the second base materials, and
 bonding the first and the second base materials.

* * * * *